United States Patent
VanderBaan et al.

(10) Patent No.: US 7,395,204 B2
(45) Date of Patent: Jul. 1, 2008

(54) METHODS AND APPARATUS FOR PROVIDING PUSH TO TALK TEXT DATA

(75) Inventors: Kabe VanderBaan, Chicago, IL (US); Jeffrey T. Eschbach, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 66 days.

(21) Appl. No.: 11/094,646

(22) Filed: Mar. 30, 2005

(65) Prior Publication Data

US 2006/0229883 A1    Oct. 12, 2006

(51) Int. Cl.
*G10L 21/06* (2006.01)
(52) U.S. Cl. ....................................... 704/235
(58) Field of Classification Search ................. 704/235
See application file for complete search history.

(56) References Cited

U.S. PATENT DOCUMENTS

| | | | |
|---|---|---|---|
| 6,385,586 B1 * | 5/2002 | Dietz | 704/277 |
| 6,446,041 B1 * | 9/2002 | Reynar et al. | 704/260 |
| 6,775,360 B2 * | 8/2004 | Davidson et al. | 379/88.14 |
| 2004/0015547 A1 * | 1/2004 | Griffin et al. | 709/204 |
| 2004/0022208 A1 * | 2/2004 | Dahod et al. | 370/328 |
| 2004/0199393 A1 * | 10/2004 | Arizmendi et al. | 704/277 |
| 2006/0104293 A1 * | 5/2006 | Kopp et al. | 370/401 |

OTHER PUBLICATIONS

Dragon Natually Speaking: http;://www.scansoft.com/naturallyspeaking, Mar. 2005.
Computer Talk: http://www.computer-talk.com/, Mar. 2005.

* cited by examiner

*Primary Examiner*—Susan McFadden

(57) ABSTRACT

In the present technique of push to talk communications system, a push to talk audio data message is translated to text data to provide for a translated text data message. The push to talk audio data message is then associated with the corresponding translated text data message to provide for an association of the audio and text messages. The translated text data message is accordingly sent to one or more destinations.

21 Claims, 6 Drawing Sheets

METHODS AND APPARATUS FOR PROVIDING PUSH TO TALK TEXT DATA

TECHNICAL FIELD

This invention relates generally to methods for providing push to talk text data.

BACKGROUND

Push to talk calls generally use a forced-audio model where the user of the receiver mobile station ("MS") does not have to answer the call in order to set up the call. Since push to talk technology includes dispatch calls, "push to talk," as used herein, shall be understood to serve as an expression of convenience that encompasses various kinds of push to talk communications including networks that employ a dispatcher and those that do not. Because of this configuration of push to talk calls, the user of the receiver MS may miss the audio message of the push to talk call, because the MS may be inaccessible (e.g., the MS is in the user's pocket and/or the user is away from the MS) to provide for clear audio output. In this scenario, the user of the receiver MS may hear a noise that indicates a call coming in but may be unable to make out the actual call message, which would likely generate unnecessary follow up push to talk calls between the sender and receiver to clarify the previously made call message.

This uncertainty and lack of clarity not only unnecessarily wastes transmission resources but also degrades user experience. In the worst case scenario, the user may not know at all that a push to talk call was received until the phone log is checked. There may also be circumstances where certain factors (e.g., background noise and/or interference) may hinder the audio reception, resulting in unreliable audio outputs. Unreliable push to talk audio data messages become especially critical when the calls are exchanged in a dispatcher emergency setting where time is of the essence and wrong information can be fatal.

BRIEF DESCRIPTION OF THE DRAWINGS

The above needs are at least partially met through provision of the push to talk text data described in the following detailed description, particularly when studied in conjunction with the drawings, wherein.

Figure 1:
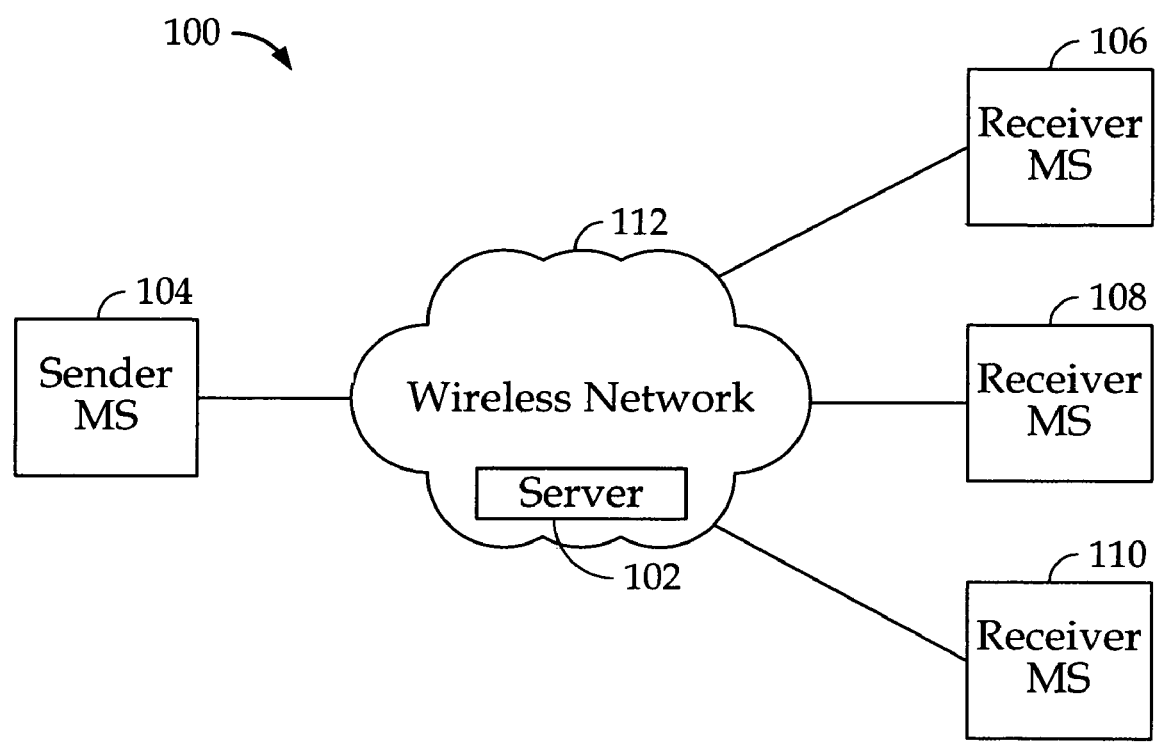
FIG. 1 comprises a wireless communications system suitable for various embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a push to talk audio data message is translated to text data to provide a translated text data message, wherein an association is made between the push to talk audio data message and the translated text data message. The translated text data message is then sent to at least one destination, which may be defined as a group of a plurality of destinations. According to one embodiment, the push to talk audio data message, the translated text data message, and/or the association is/are saved, and a state that allows a status of the translated text data message to be modified may be enabled. The push to talk audio data message may also be sent to another destination according to one embodiment. In another embodiment, prior to the translation of the audio data message, a user profile corresponding to a user identifier is assessed responsive to the receipt of the push to talk audio data message linked to the user identifier. The translated text data message is thereby translated based on this assessed user profile.

According to various embodiments, responsive to the translated text data message associated with the push to talk audio data message being received, the translated text data message is provided to a user. According to an embodiment, the push to talk audio data message is also provided to the user. In one embodiment, the translated text data message is received with a status indicator that defines a current status, which includes an unconfirmed status, a confirmed status, and a denied status according to an embodiment, of the translated text data message. The translated text data message along with the current status is accordingly provided to the user. According to another embodiment, the translated text data message and/or the current status are saved to a data structure. In one embodiment, responsive to receiving another status indicator that defines an updated status of the translated text data message, the translated text data message is updated with the updated status and saved to the data structure. The updated status is then sent to at least one destination defined as a group of a plurality of destinations.

According to various embodiments, responsive to receiving a selection of at least one translated text data message being recalled, the push to talk audio data message that is associated with the translated text data message is looked up and provided to the user. The recalled push to talk audio data message may be identified as such to distinguish it from a push to talk audio data message from a new call. In one embodiment, the translated text data messages that are previously saved to a data structure are provided to the user for the selection process.

Through these various teachings, a mechanism to augment push to talk audio data with text (e.g., automated speech-to-text) has been presented that provides, among other things, for persistence and increased reliability of the push to talk communications system. Transitions between chaotic environments are addressed more seamlessly as a result, especially in public safety dispatcher environments. This is especially helpful when the translated text can be sent simultaneously to multiple users, such as emergency responders, with a push of a single button. Users are enabled to recall previously stored audio messages and set the status of the translated text data of the audio data. These functions further ensure that the push to talk calls are accurately presented to the user, and the persistent text translation adds a clearer interface to access specific audio clips that were stored. Thus, through the various teachings described, a more stable and robust push to talk system is provided that ensures clearer push to talk messages being exchanged between users. These added features described are especially desired for emergency dispatch systems where clarity and speed are critical.

Referring now to the drawings, and in particular to FIG. 1, for purposes of providing an illustrative but non-exhaustive example to facilitate this description, a specific operational paradigm using a wireless communication system is shown and indicated generally at 100. Those skilled in the art, however, will recognize and appreciate that the specifics of this illustrative example are not specifics of the invention itself and that the teachings set forth herein are applicable in a variety of alternative settings. For example, since the teachings described are not platform dependent, they can be applied to various systems, such as, but not limited to, Code Division Multiple Access (CDMA) systems, Time Division Multiple Access (TDMA) systems, Universal Mobile Telecommunications Systems ("UMTSs"), General Packet Radio Service ("GPRS") systems, Internet Protocol based systems, and non-cellular network systems. In fact, any communication networks that include the feature of push to talk calling are contemplated and are within the scope of the invention.

Referring now to the exemplary wireless communication system 100 shown in FIG. 1, a server 102 is included for exchanging communications between multiple sender MSs (one shown) 104 and receiver MSs (three shown) 106, 108, 110 via a wireless network 112. For example, in one embodiment, when the sender MS 104 sends a push to talk audio data message to multiple receiver MSs, the push to talk audio data message is sent to the server 102 for processing. The server 102, in response, translates the audio push to talk message to a text data message and provides it to the multiple recipients of the MSs 106, 108, 110 (e.g., the receiver MS). In another embodiment, the sender MS, itself, may instead translate the audio push to talk message. As shown, numerous different implementations are possible through the various teachings provided, and other implementations using whole or part of any components in the system, although may not be specifically shown, are contemplated and thus are within the scope of the invention. Moreover, because current cell phones have many similar functions to that of computer devices, a mobile station will be herein used to refer to any device that can transmit data packets, which includes, but is not limited to, cell phones, personal digital assistants, and/or computers.

Figure 2:
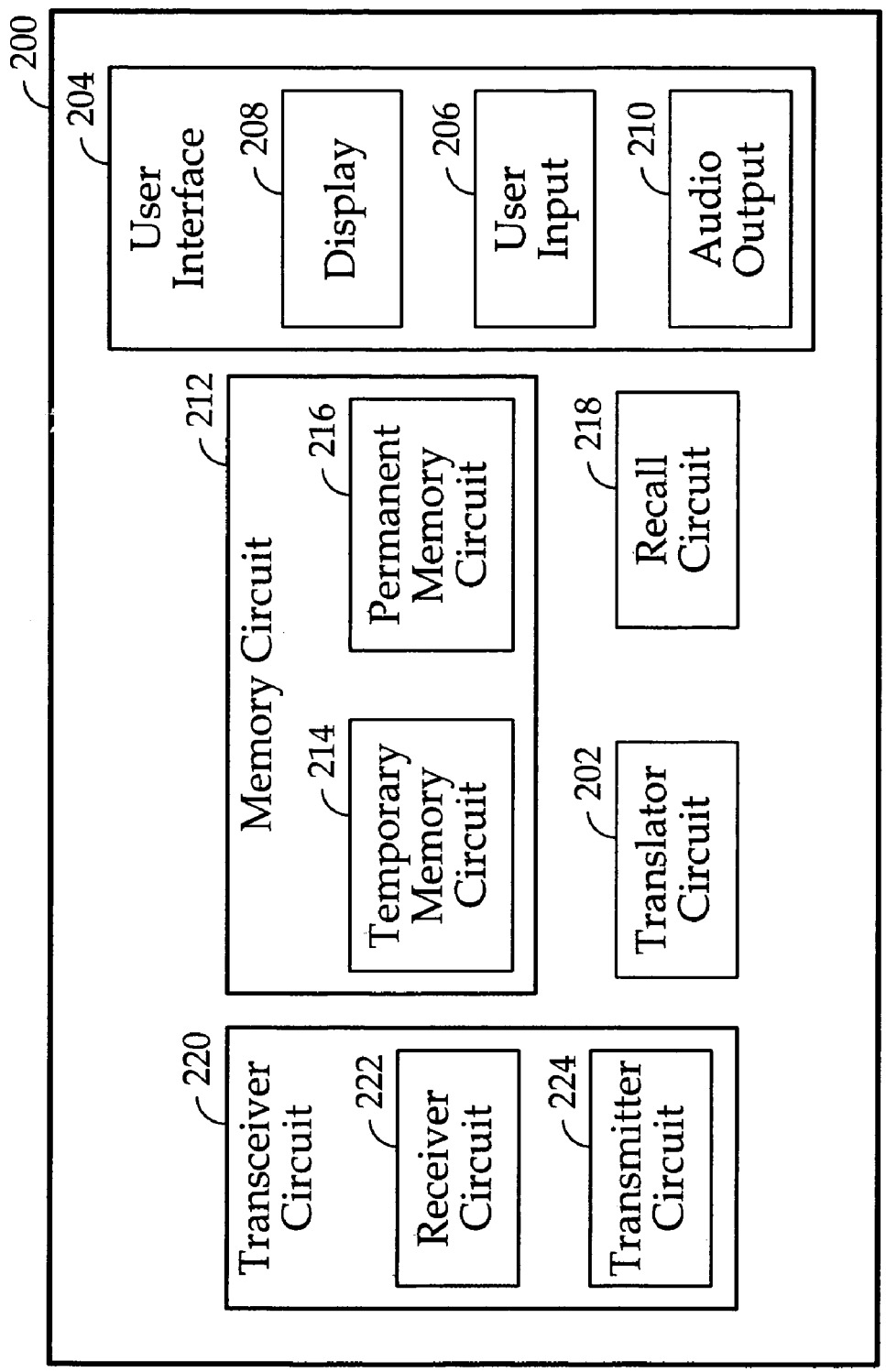
FIG. 2 comprises an overview of a mobile station according to various embodiments of the invention.

Referring to FIG. 2, a mobile station according to various embodiments of the invention is shown and indicated generally at 200. These various teachings contemplate either adapting the MSs 104, 106, 108, 110 and/or the server 102 to fully or partially implement the various embodiments described. As a result, the present transmitter circuit is given as one of many configurations and circuitry topologies available, and these various alternative embodiments, although not shown, are readily appreciated by one skilled in the art. Thus, they are within the scope of the various teachings described. The MS shown is a partial view of the circuit topology of a mobile device. As such, it should be understood that the various teachings may include other circuit components that are well known in the art that may not be shown. Moreover, circuit refers to any type of executable instructions that can be implemented as hardware, firmware, and/or software, which are all within the scope of the various teachings described.

In this exemplary MS 200 shown, a translator circuit 202 is included for translating any push to talk audio data message inputted by the user of the MS to provide a translated text data message of the push to talk audio data message. Specifically, as typically done at a MS, the user speaks into a microphone (not shown) provided by a user interface 204 that includes a user input 206. In response, the translator circuit 202 accordingly receives and translates the audio message from the user to provide a translated text message associated with the audio message. This translated text message can then be displayed to the user using a display 208 of the user interface 204. An audio output 210 is also included with the user interface for providing the push to talk audio data messages.

According to various embodiments, the user of the MS can also recall previously stored audio data messages associated with the translated data messages, or vice versa. Specially, a memory circuit 212 having a temporary memory circuit 214 and a permanent memory circuit 216 are included for maintaining these previously stored audio data messages and translated data messages along with their associations. Responsive to the user's request of the previously translated text messages to be displayed, a recall circuit 218 obtains the stored translated text messages from the permanent memory circuit 216 and displays them to the user using the display 208. The user then makes a selection of a translated text message associated with an audio data message that is to be recalled, and in response, the recall circuit 218 accordingly looks up and provides the recalled audio data message to the user. According to another embodiment, the server 102 instead can translate and maintain these translated text messages. In this case, the recall circuit 218 would then simply forward the user's request to the server 102 via a transceiver circuit 220. As typically done in any MS, a receiver circuit 222 for receiving data and a transmitter circuit 224 for transmitting data are included in the transceiver circuit 220 to effectuate communications exchange between the server 102 and the MS 200.

Figure 3:
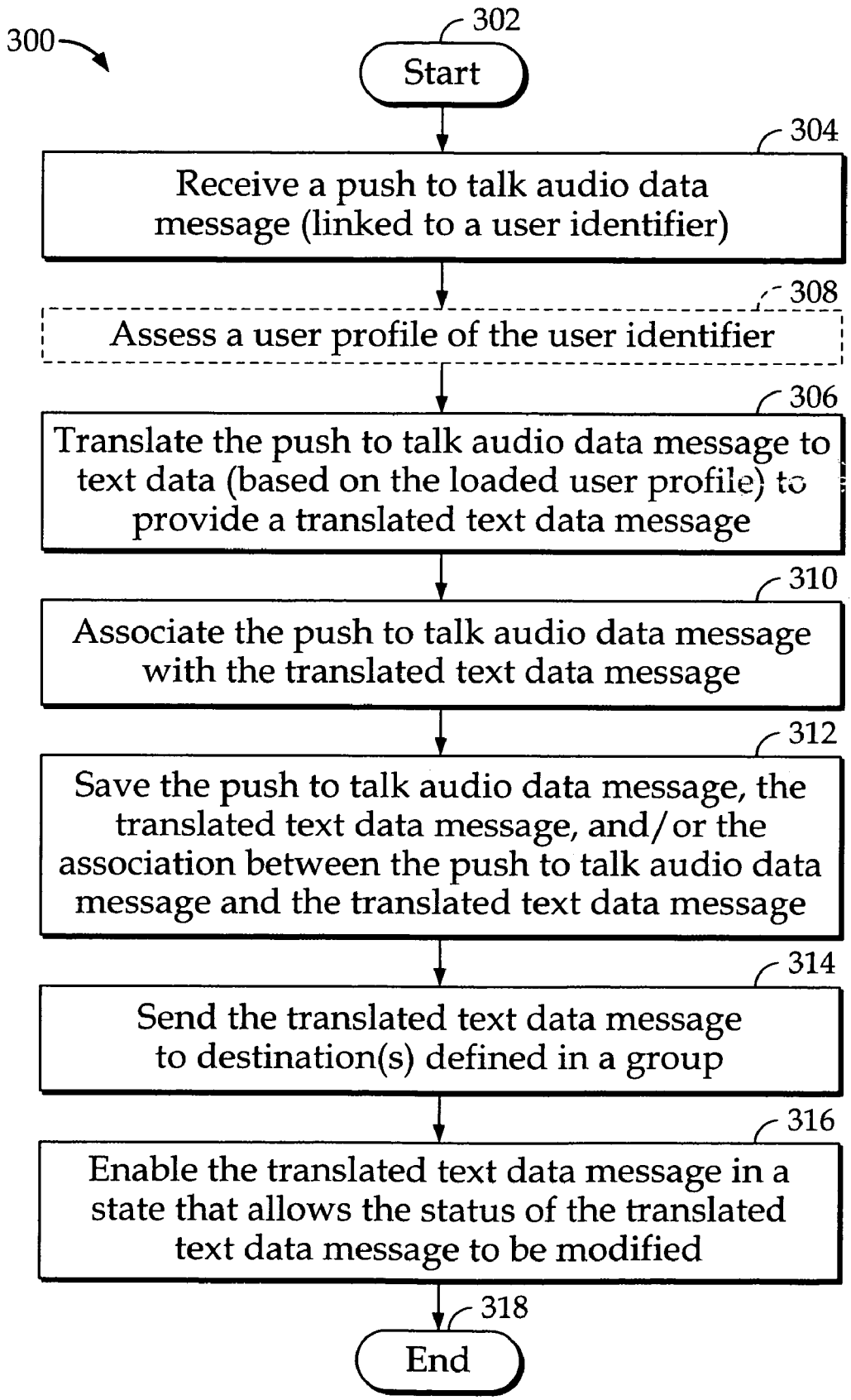
FIG. 3 comprises a flow chart diagram of a translation process according to one embodiment of the invention.

Turning now to FIG. 3, a flow diagram of a translation process according to one embodiment is shown and indicated generally at 300. Although the process shown is preferably implemented at the server 102, there may be other implementations of each of the processes shown that are better suited for the receiver MS 104 in the communication system 100. These processes shown, thus, can be implemented fully or partially at any of the components within the system 100. Moreover, as one skilled in the art can readily appreciate, any of the processes shown can be altered in multiple ways to achieve the same functions and results of the various teachings described. As a result, these processes shown are one exemplary embodiment of multiple variation embodiments that may not be specifically shown. The processes shown are, thus, directed to the system 100, and each of them may be altered slightly to accommodate any of the components in the communications system. These other embodiments are within the scope of the various teachings described.

In light of this, the particular translation process 300 shown starts 302 with a push to talk audio data message being received 304. In response, the push to talk audio data message is translated 306 to text data in order to provide for a translated text data message of the push to talk audio data message. According to one embodiment, the push to talk audio data message can optionally include a link to a user identifier of the sender that previously provided the message. This embodiment of including the user identifier is especially helpful when the translation is done at the server 102 instead of the sender MS 104. In such a case, the user profile of the user identifier is assessed 308 and used during the translation to provide for the translated text data message of the push to talk audio data message.

Once the translated text data message of the push to talk audio data message has been obtained, the translated text data message and the push to talk audio data message are associated 310 to provide an association between the two messages.

The push to talk audio data message, the translated text data message, and/or their corresponding association is/are then saved 312 to a data structure in the system. The translated text data message is also sent 314 to one or more destinations, which may be defined in a group, such as a talk group, according to one embodiment. Please note that destination(s) includes MSs 104, 106, 108, 110 as well as server 102. The destinations that are included for sending the messages greatly depends upon who is sending the message and the type of message being sent. For example, if the server 102 is sending out the translated text data message, the destinations may include the sender MS 104 and the receiver MS 106, 108, 110. If the receiver MS 104 is sending an update of a translated text data message previously sent, the destinations may include the server 102 for maintaining the update in a data base and receiver MS 106, 108, 110 for updating the user on the status of the translated text data message. As readily appreciated by one skilled in the art, these various embodiments of predefined destinations are implementation specific, and as such, they are within the scope of the various teachings described.

According to one embodiment, the translated text data message can include a status that indicates the current condition of the translated text data message. In this embodiment, the translated text data message is preferably enabled 316 in a state that allows a status of the translated text data message to be modified. Multiple statuses are contemplated for different implementations. For example, in one embodiment, the translated text data message can indicate, but is not limited to, being a confirmed, unconfirmed, and/or denied message. Confirmed status can indicate that the translated text data messages have been confirmed by the sender that the translated text accurately represents the audio push to talk message in text form, and unconfirmed status indicates that the translated text data messages have not been confirmed. Denied messages, on the other hand, can be chosen by the sender to indicate to the group that the translated text data message previously sent does not in fact accurately represent the audio push to talk message. As is well appreciated by a skilled artisan, since other predefined statuses that are specific to the implementation can be used, other embodiments of the different statuses are within the scope of the various teachings described, even if they are not specifically shown. Once the translated text data message has been enabled 316 in the state that allows for modification of the status described, the translation process ends 318 at this point.

Figure 4:
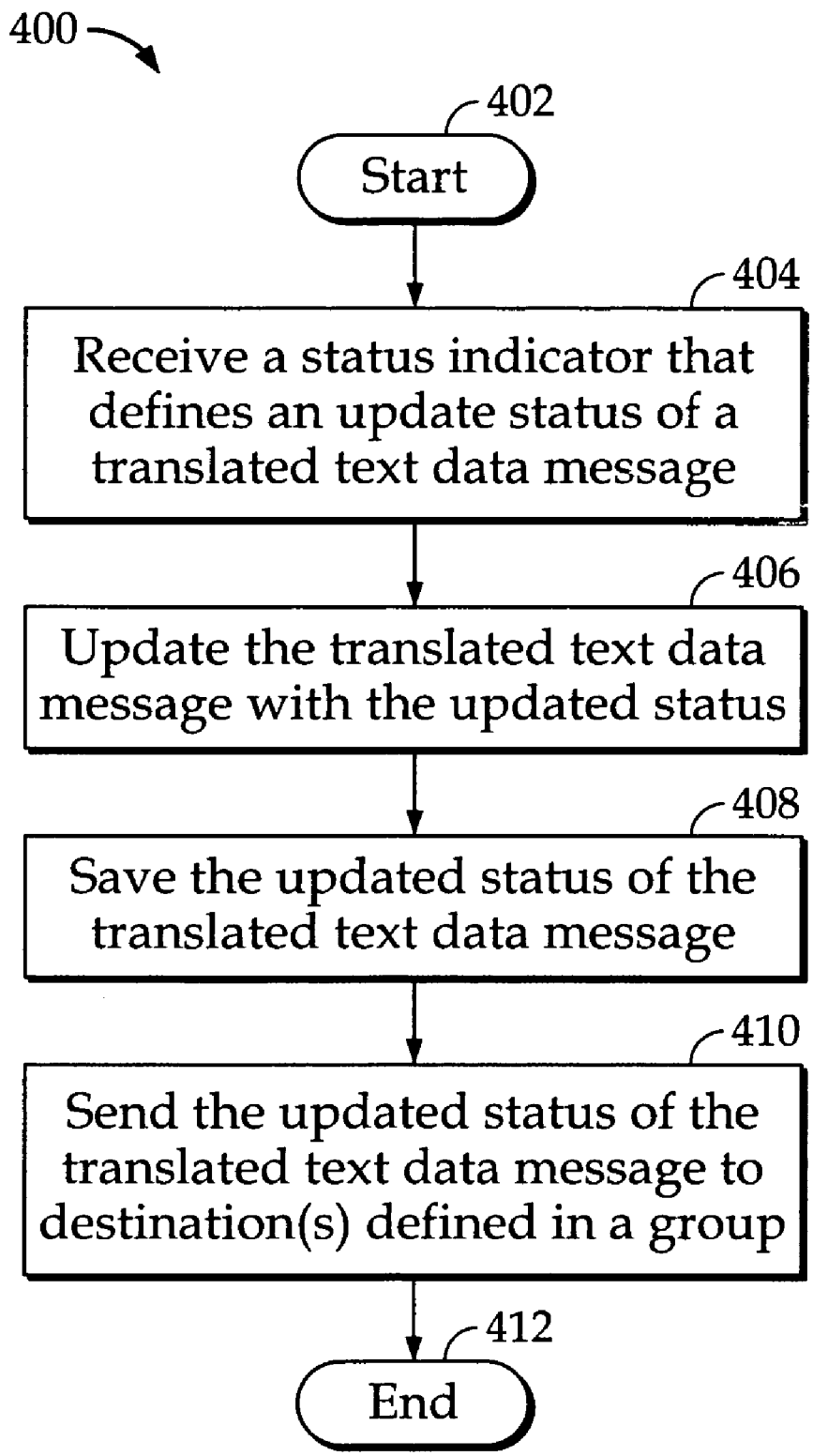
FIG. 4 comprises a flow chart diagram of an update process according to one embodiment of the invention.

Turning now to FIG. 4, a flow chart diagram of an update process according to one embodiment is shown and indicated generally at 400. The update process is initiated 402 in response to receiving 404 a status indicator that defines an update status of a translated text data message. Recall from FIG. 3 that the translated text data messages were set in a state that allows for modification of a status of the translated text data messages. According to one embodiment, the translated text data messages are initially sent with a default status, such as an unconfirmed status. The sender can then at some point update the status of the translated text data message that was previously sent.

For example, in the implementation where the server 102 maintains and/or translates these translated text data messages for each user identifier, the sender MS 104 sends the status indicator that defines an update status of a particular translated text data message to the server. In the implementation where the sender MS 104 maintains and/or translates the translated text data messages, on the other hand, the status indicator can be simply passed onto the translator circuit 202. In either implementation, this action by the sender user invokes a status indicator being sent to the server 102 or the translator circuit 202, and the update process 400 is initiated 402 by this status indicator being received from the sender user. In response, the update status indicated by the status indicator is accordingly updated 406 and saved 408 to the translated text data messages. And since the status of a translated text data message has been changed, the updated status is sent 410 to one or more destinations defined in the group that received the previously sent translated text data message. The update process ends 412 at this point.

Figure 5:
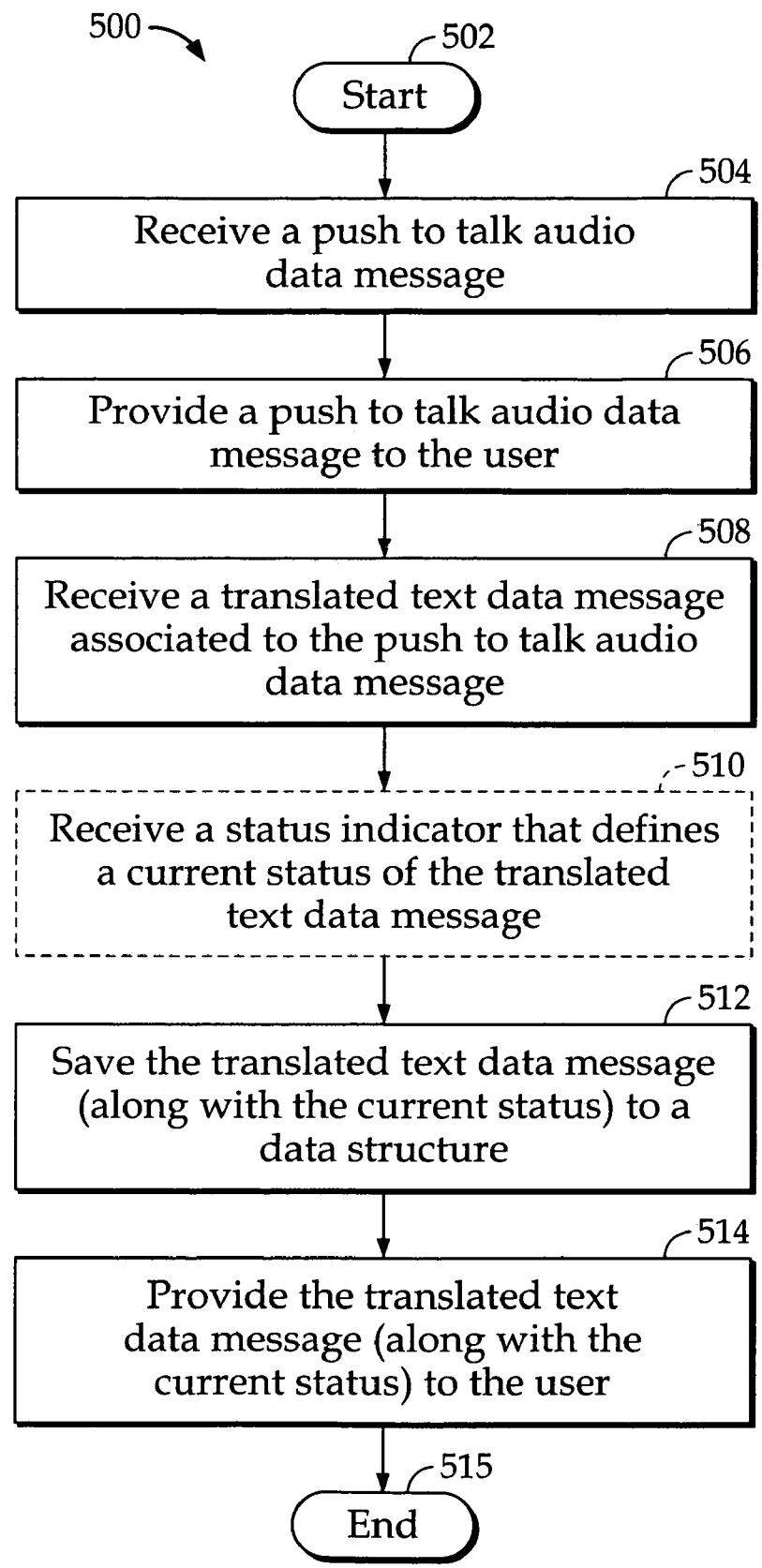
FIG. 5 comprises a flow chart diagram of a receive process according to one embodiment of the invention.

Turning now to FIG. 5, a flow chart diagram of a receive process according to one embodiment is shown and indicated generally at 500. This process, as shown, starts 502 with the receipt 504 of a push to talk audio data message, which is provided 506 to the user. The translated text data message associated with the push to talk audio data message is also received 508. An optional status indicator of the translated text data message may also be received or included 510, which defines a current status. It is important to note that although the push to talk audio data message is shown as being received prior to the translated text data message, there may be other implementations where the translated text data message is received before the push to talk audio data message.

In other words, since the receive process 500 does not translate the push to talk audio data message, the translated text data message can be received before the push to talk audio data message. Moreover, the order in which the audio and translated text messages are provided to the user is also not important. After the translated text data message is received 508, which may include 510 the optional status indicator, the translated text data message along with the current status indicated by the optional status indicator is saved 512 to a data structure, such as a log or database. The translated text data message along with the current status is then provided 514 to the user, which ends 516 the receive process. It should also be noted that more optional information, such as an identity of the originator sender device and/or user, can be included along with the translated text data message and/or the push to talk audio data message when provided to a user. These embodiments of adding additional optional information along with the translated text data message and/or the push to talk audio data message are contemplated and are within the scope of the various teachings described. Furthermore, another embodiment of providing the push to talk audio data message is contemplated. Specifically, in place of the original push to talk audio data message from the sender, separate audio data can be provided using the translated text data message. This is especially useful once the translated text data message has been confirmed in its accuracy.

Figure 6:
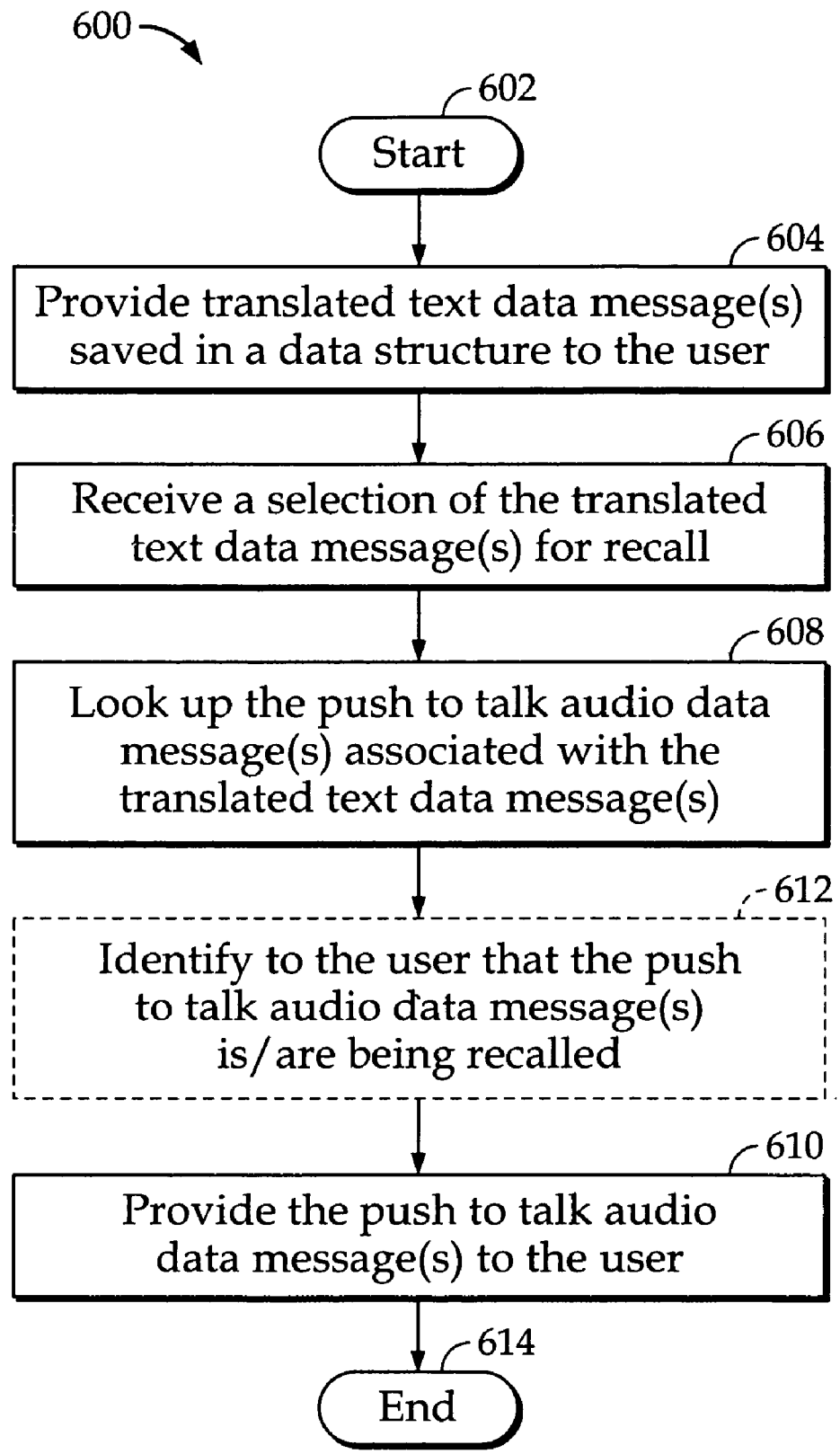
FIG. 6 comprises a flow chart diagram of a recall process according to one embodiment of the invention.

Referring now to FIG. 6, a flow chart diagram of a recall process according to one embodiment is shown and indicated generally at 600. As described, because the push to talk audio data message with its corresponding translated text data message are maintained and saved to a data structure, such as a log or database, users are enabled to recall any of the push to talk audio data messages previously sent or received. In the current embodiment shown, the recall process 600 starts 602 by providing 604 a list of translated text data messages that were saved to the data structure. A selection of one or more translated text data messages for recall is received 606 from the user. Again, depending on the implementation, any of the steps shown in the process can be fully or partially performed at the server and/or the MSs 104, 106, 108. 110. Responsive to the selection from the user, the push to talk audio data message associated with the selected translated text data messages is looked up 608 and provided 610 to the user. Moreover, the recalled push to talk audio data message is optionally identified 612 as a recalled message to distinguish it from a push to talk message being received from a new call. This brings the recall process to an end 614 since the associated push to talk audio message has been provided 610 to the user. It should be noted that the recalled push to talk message can also be provided with an identity of the originator sender user and/or device, which can be some text displayed to the user and/or a short audio indicator before the message is replayed.

With these various teachings shown, a novel push to talk communications system that provides, among other things, a translated text data message associated with a push to talk audio data message. The use of the translated text data message corresponding to the push to talk audio data message effectively results in a more persistent and reliable push to talk communications system. For example, the translated text data message ensures that transitions between chaotic environments are addressed more seamlessly. This is especially useful in public safety dispatcher environments, because the translated text can be sent as a backup to the push to talk audio data message that may have been disrupted due to bad reception and/or inaccessibility of the user. Moreover, because the translated text data message can be sent simultaneously to multiple users, such as emergency responders, with a push of a single button, the system also nicely accommodate group recipients, such as talk groups.

Through the various embodiments, users are also enabled to recall previously stored push to talk audio messages and set a status of the translated text data of the audio data. This function further ensures that the push to talk calls are accurately presented to the user, and the persistent text translation adds a clearer interface to access specific audio clips that were stored. Through the various teachings of the embodiments described, a more stable and robust push to talk system is, thus, provided that ensures clearer push to talk messages being exchanged between users. These added features described are especially desired for emergency dispatch systems where clarity and speed are critical.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   translating a push to talk audio data message to text data to provide a translated push to talk data message;
   associating the push to talk audio data message with the translated push to talk data message to provide an association of the push to talk audio data message and the translated push to talk data message;
   sending the translated push to talk data message to at least one destination; and
   saving the push to talk audio data message, the translated push to talk data message, and the association of the push to talk audio data message and the translated push to talk data message in a permanent memory for subsequent recall.

2. The method according to claim 1 further comprising:
   sending the push to talk audio data message to at least one destination.

3. The method according to claim 1 further comprising, prior to translating the push to talk audio data message to text data to provide the translated push to talk data message:
   receiving the push to talk audio data message as linked to a user identifier;
   assessing a user profile corresponding to the user identifier;
   wherein the translated push to talk data message is translated based on the user profile.

4. The method according to claim 1, wherein the at least one destination is defined as a group of a plurality of destinations.

5. The method of claim 1, wherein a wireless mobile station generates the push to talk audio data message and performs the translating, the associating, and the sending.

6. A method comprising:
   translating a push to talk audio data message to text data to provide a translated text data message;
   associating the push to talk audio data message with the translated text data message to provide an association of the push to talk audio data message and the translated text data message;
   sending the translated text data message to at least one destination;
   saving the push to talk audio data message, the translated text data message, and the association of the push to talk audio data message and the translated text data message in a permanent memory for subsequent recall; and
   enabling a state that allows a global status of the translated text data message to be modified by a user, the user being one of a first mobile station transmitting the text data message and a second mobile station receiving the translated text data message, wherein the global status is accessible to multiple entities.

7. A method comprising:
   receiving a translated push to talk data message associated with a push to talk audio data message;
   providing the translated push to talk data message to a user; and
   saving the translated push to talk data message and an association of the push to talk audio data message and the translated push to talk data message in a permanent memory for subsequent recall by at least a remote user.

8. The method according to claim 7 further comprising:
   providing the push to talk audio data message to the user.

9. The method of claim 7, wherein a wireless mobile station generates the push to talk audio data message and translates the audio data message to generate the translated push to talk data message.

10. The method according to claim 7 further comprising:
    receiving a state indicator that defines a current global status of the translated push to talk data message;
    providing the current status of the translated push to talk data message to a user; and
    wherein the global status is accessible to multiple entities.

11. The method according to claim 10, wherein the current global status comprises any one or more statuses selected from a group of an unconfirmed status, a confirmed status, and a denied status.

12. The method according to claim 10 further comprising:
    saving the current global status of the translated push to talk data message to a data structure.

13. The method according to claim 12 further comprising:
    receiving another global status indicator that defines an updated status of the translated push to talk data message;
    updating the translated push to talk data message with the updated status;
    saving the updated status of the translated push to talk data message to the data structure, wherein the global status indicator is accessible to multiple entities.

14. The method according to claim 13 further comprising:

sending the updated status of the translated push to talk data message to at least one destination defined as a group of a plurality of destinations.

15. A method comprising:

receiving a selection of at least one translated push to talk data message for recall;

looking up a push to talk audio data message associated with each of the at least one translated push to talk data message selected for recall, wherein an association of the push to talk audio data message and the at least one translated push to talk data message is utilized in the looking up in a permanent memory for subsequent recall;

providing the push to talk audio data message to a user.

16. The method according to claim 15 further comprising, prior to receiving the selection of the at least one translated push to talk data message for recall:

providing at least one translated push to talk data message saved in a log to the user.

17. The method according to claim 15 further comprising:

identifying the push to talk audio data message as being recalled.

18. An apparatus comprising:

a memory circuit having a push to talk audio data message, a translated push to talk data message associated with the push to talk audio data message, and an association between the push to talk audio data message and the translated push to talk data message in a permanent memory for subsequent recall;

a user interface that provides the translated push to talk data message to a user.

19. The apparatus as defined in claim 18 further comprising:

a translator circuit having the push to talk audio data message, wherein the translator circuit translates the push to talk audio data message to text data to provide the translated push to talk data message.

20. The apparatus as defined in claim 18 further comprising:

a recall circuit having the translated push to talk data message, wherein the recall circuit looks up the push to talk audio data message associated with the translated push to talk data message responsive to a selection of the translated push to talk data message for recall.

21. The apparatus as defined in claim 18 further comprising at least one of:

a receiver circuit that receives the push to talk audio data message and the translated push to talk data message;

a transmitter circuit that sends the translated push to talk data message to at least one destination defined as a group of a plurality of destinations.

* * * * *